A. N. DAVIS.
TRAIN PIPE COUPLING.
APPLICATION FILED APR. 27, 1906.
898,561. Patented Sept. 15, 1908.
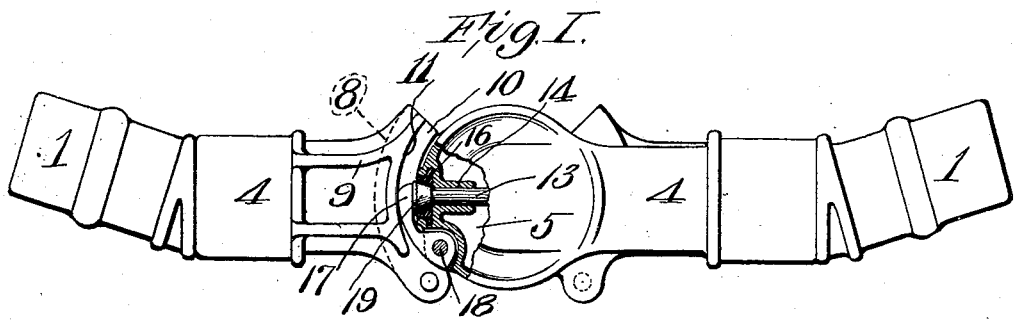
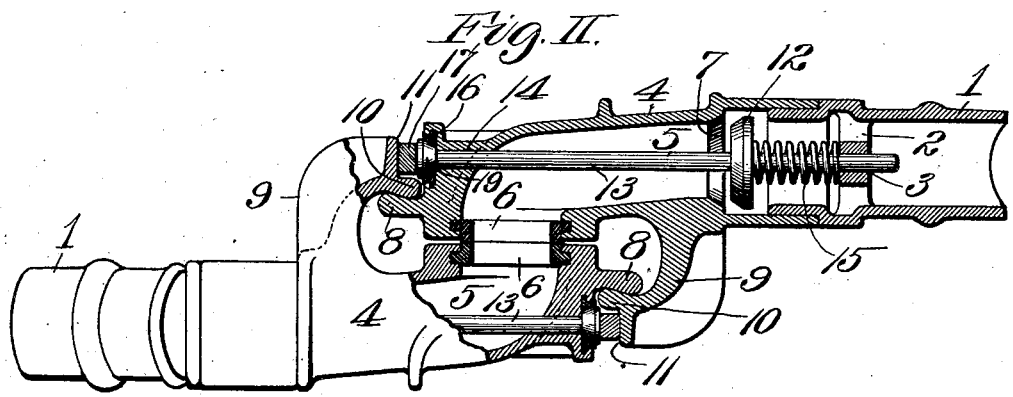
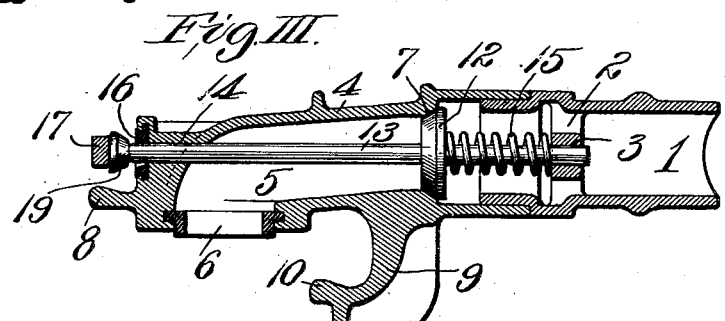
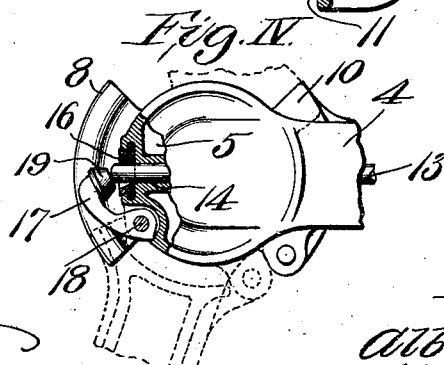

UNITED STATES PATENT OFFICE.

ALBERT N. DAVIS, OF ST. LOUIS, MISSOURI.

TRAIN-PIPE COUPLING.

No. 898,561.  Specification of Letters Patent.  Patented Sept. 15, 1908.

Application filed April 27, 1906. Serial No. 313,964.

*To all whom it may concern:*

Be it known that I, ALBERT N. DAVIS, a citizen of the United States, residing in the city of St. Louis, in the State of Missouri, have invented certain new and useful Improvements in Train - Pipe Couplings, of which the following is a full, clear, and exact description, reference being had to the accompanying drawing, forming part of this specification.

My invention relates to a coupling for uniting train-pipes of air brakes, and it has for its object to provide a construction whereby the flow of air through the coupling may be instantly secured when the coupling members are joined, and whereby the flow of air from the train-pipes may be instantly cut off when the coupling members are disconnected.

Figure I is a top or plan view of my coupling in which one of the members is partly broken out and shown in section. Fig. II is a view partly in elevation and partly in longitudinal section of the coupling. Fig. III is a longitudinal section of one of the coupling members. Fig. IV is a view of the joining ends of the coupling with one of the members thereof shown partly in section, the coupling members being illustrated in the position assumed during the act of connecting or disconnecting them.

1 designates nipples to which sections of train-pipe to be united are applied. Each of these nipples are provided interiorly with a spider 2 containing an aperture 3.

4 designates the coupling members each of which is provided with an interior duct 5 opening laterally at the forward end of the member and preferably having located therein at said forward end a gasket 6. In each coupling member, near its rear end, is a valve seat 7. Each of the coupling members is provided with a segmental lug 8 projecting from its forward end. Each member is also provided with an arm 9 that terminates in a segmental lug 10 adapted to engage the segmental lug 8 of the other member for the purpose of drawing the facing ends of the coupling members to each other when they are assembled. In proximity to the segmental lugs 10 upon each arm 9 is a curved flange 11 that is adapted to face the adjacent end of the other coupling member when the members are assembled.

12 designates valves adapted to be moved to the valve seats 7 in the coupling members for the purpose of closing communication between the train pipes and coupling member ducts 5, or to be removed from said seats for the purpose of opening communication between the train pipes and the coupling member ducts. The valves 12 are fixed to slide rods 13, the rear ends of which are loosely seated in the apertures 3 of the nipple spiders 2 and the forward ends of which are loosely seated in the forward ends of the coupling members at 14.

15 are expansion springs surrounding the slide rods 13 between the spiders 2 and the valves 12. These springs tend to force the valves to their seats and they so act when the slide rods are under restraint. The forward ends of the slide rods extend to the exterior of the coupling members and they are surrounded by packing rings 16 that also serve the additional function of valve seat members as will hereinafter appear.

17 designates swinging slide rod actuating arms that are pivoted to the forward ends of the coupling members at 18 (see Figs. I and IV) and each of which terminates at its free end in a valve 19, preferably of conical shape, that is adapted to seat against the corresponding packing ring 16 surrounding the slide rod 13.

When the coupling members are disconnected from each other the air within the train-pipes acts against the valves 12 to force them to their seats 7 to prevent the escape of air from the pipes through the coupling members, and this seating action of the valves is rendered more positive by the action of the spring 15 which press against the rear faces of the valves. When the valves move to their seats the slide rods 13 are shifted longitudinally in a forward direction so that their forward ends protrude through the forward ends of the coupling members, as seen in Figs. III and IV, thereby throwing the spring arms 17 and their valves 18 in an outward direction.

When the coupling members are joined by the usual twisting method of assembling them the flanges 11 of the coupling member arms 9 press against the valve carrying swinging arms 17, thereby carrying the valves 19 to their seats in the packing rings 16 and at the same time forcing the slide rods 13 rearwardly with the result of unseating the main valves 12 and permitting immediate flow of air into and through the coupling members. The valves 12 controlling the escape of air from one section of train-pipe to the other are thereby positively unseated to remain in such condition until the coupling is again disconnected, and the valves 19 are held firmly to their seats to prevent any escape of air through the coupling around the slide rods 13.

I claim as my invention:

1. In a train pipe coupling, the combination of a pair of coupling members, one of which is provided within with a valve seat, a valve arranged to be reciprocated to and from said seat, a slide rod by which said valve is carried and which extends to the exterior of said coupling member, and a pusher arm pivoted upon said coupling member and adapted to be actuated by the other coupling member; said pusher arm being provided with a valve adapted to close the aperture in the coupling member through which said slide rod operates.

2. In a train pipe coupling, the combination with a pair of coupling members, of a valve in each of said members, a valve rod upon which said valve is rigidly secured, said valve rod being slidably supported at one end in a perforation in the wall of one of the coupling members, a valve seat in the outer end of said perforation, and a pusher arm pivoted to the coupling member; said pusher arm being adapted to act as a valve to close the aperture after the valve rod has been displaced therefrom to operate the valve.

3. In a train pipe coupling, the combination with a pair of coupling members, each of which is interiorly provided with a valve seat; of valves movable in straight lines to and from the seats; valve rods upon which the valves are fixed, one end of each of said valve rods extending through a perforation in the wall of said coupling member to the exterior thereof; pusher arms adapted to transmit movements to the valve rods to operate the valves each being provided with a valve for closing said perforations; and means carried by each member for operating the pusher arm of the other member when the coupling members are connected.

4. In a train pipe coupling, the combination with the end of a valve rod extending through an aperture in the wall of the coupling; of a valve seat in the outer end of said aperture; a pusher arm mounted on the exterior wall of the coupling and adapted to displace the valve rod in the aperture and to seat as a valve upon said valve seat.

ALBERT N. DAVIS.

In presence of—
BLANCHE HOGAN,
NELLIE V. ALEXANDER.